United States Patent [19]

Roeder

[11] 4,092,016

[45] May 30, 1978

[54] ADJUSTABLE CUTTING TORCH MACHINE

[75] Inventor: Georg Roeder, Frankfurt am Main, Germany

[73] Assignee: Messer Griesheim GmbH, Frankfurt am Main, Germany

[21] Appl. No.: 650,712

[22] Filed: Jan. 20, 1976

[30] Foreign Application Priority Data

Mar. 1, 1975 Germany .............................. 2509060

[51] Int. Cl.² ................................................ B23K 7/10
[52] U.S. Cl. ..................................................... 266/77
[58] Field of Search ................................... 266/76, 77

[56] References Cited

U.S. PATENT DOCUMENTS

| 2,373,541 | 4/1945 | Chelborg et al. | 266/76 |
| 2,412,281 | 12/1946 | Mott et al. | 266/76 |
| 2,665,900 | 1/1954 | Begerow | 266/76 |
| 3,911,346 | 10/1975 | Schneekloth | 266/77 X |

FOREIGN PATENT DOCUMENTS

| 561,653 | 1958 | Canada | 266/76 |
| 886,558 | 1943 | France | 266/76 |
| 4,616,412 | 1971 | Japan | 266/76 |

Primary Examiner—Roy Lake
Assistant Examiner—Paul A. Bell
Attorney, Agent, or Firm—Connolly and Hutz

[57] ABSTRACT

A cutting torch machine has at least one vertical support displaceably arranged on a transverse track and carries a multiple-torch aggregate whose torches can be adjusted relative to each other. The support is rotatable about its vertical axis and two horizontal shifting devices are provided at its lower end diametrically opposite each other. Each shifting device has an adjusting device consisting of a segment and a drive for moving the segment to control the angular orientation of its cutting torch.

20 Claims, 6 Drawing Figures

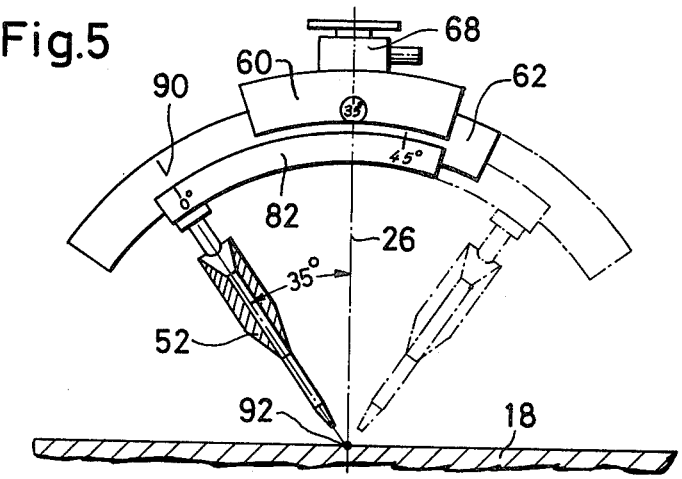
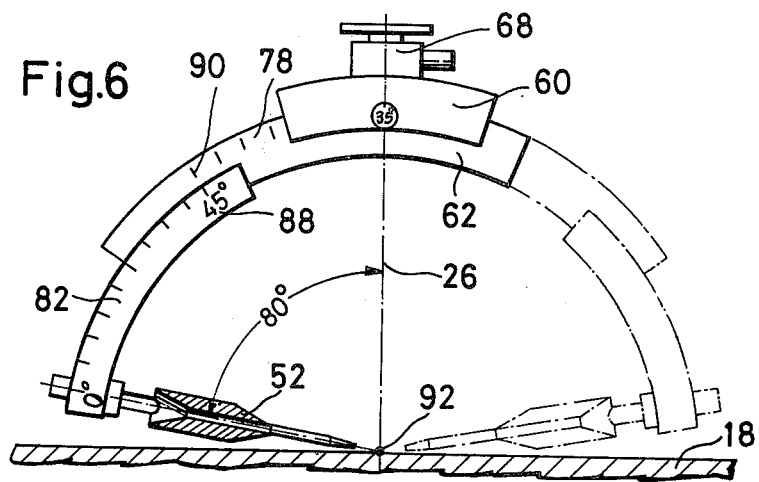

ADJUSTABLE CUTTING TORCH MACHINE

BACKGROUND OF THE INVENTION

The invention relates to a cutting torch machine with at least one suspension-device, arranged displaceably on a transverse track, for supporting a multiple torch aggregate, whose torches can be adjusted to each other, and in relation to the workpiece.

Cutting torch machines with multiple-torch-aggregates, are used for trimming the edges of workpieces (sheet metal, panels, bulk-heads, etc.) so that in a later operation workpieces which have been treated in this way can be welded together at the edges.

Such a process for the preparation of the weldingedges on sheet metal plates of large surfaces of longitudinal carriers, etc., is described in the DT-OS 2 151 395. For this preparation of welding edges, known per se, there are used, as previously mentioned, cutting torch machines with multiple-torch aggregates, of the type disclosed, for example, in U.S. Pat. No. 2,665,900. According to this practice, the two lateral torches (first and last runnings), can be adjusted to each other, and beyond this are rotatably mounted so that the torches are changeable in their angular position in relation to the vertical in order to obtain different cutting edges.

This known multiple-torch aggregate is not only relatively expensive in construction, but also is susceptible to trouble. Moreover, all torches are arranged on the same side (front side) of the aggregate. The mounting of the aggregate is arranged at the machine itself, for the taking up of the weight-restricted bending forces resulting from the one-sided loading, must be extremely stable and must particularly be vibrationless in the operation of the cutting torch machine. These conditions, particularly the insensitivity to vibrations, can be fulfilled only great difficulty, if at all.

SUMMARY OF THE INVENTION

The problem of the present invention is starting from the before-mentioned state of the art to create a cutting-torch machine whose multiple torch aggregate is maintained simple in construction without adversely affecting its safely in operation and its cutting accuracy and which can be maintained in a routine manner.

For the solution of the above-mentioned problem it is proposed according to the invention, that at the lower end of the hanging or vertical support which is rotatable around its vertical axis, there are provided two horizontal shifting devices which are diametrically arranged opposite each other, and that to each shifting device is provided a displacement device consisting of a segment and a drive whereby shifting this segment results in changing in the angular position of the cutting torch.

It is of special advantage when the lower end of the support is of square shape and that the shifting devices are fastened on its two opposite sides.

This diametrically opposed arrangement of the two shifting devices to which the two lateral torches are coordinated has the advantage that the support is not overly loaded on one side but that there is a uniform distribution of the weight (torch, shifting-device, adjusting device, etc.)

A preferred form of the shifting device is characterized in that the latter consists of a guiding frame, at the inside of which a horizontal shiftable pass element is provided, on which the setting mechanism is arranged.

The lateral (horizontal) adjustment of the cutting torch, by the setting mechanism, is preferably carried out by hand. In order to be able to carry out this shifting exactly and precisely, it is proposed according to the invention that on both sides on the pass element a threaded spindle is located in the guiding frame. Due to the preferably low thread pitch of the spindle an exact horizontal adjustment of the cutting torch is guaranteed for the production of welding edges-profiles of a definite form.

In order to be also able to adjust the extent of the shifting exactly, a scale is coordinated to the pass element connecting the holder with the adjusting device.

Besides the horizontal shifting, according to the invention a change of the angle of the cutting torches also takes place. In order to be able to carry this out a guiding element is arranged at the holder which is for taking up the segment and is coordinated to the cutting torch in its angular position. This segment which is a preferred form of the invention is curved like a circular arc, serves for the setting of the angle of the cutting torch. For the displacement of the curved segment, it is furthermore proposed that the drive is arranged on the guiding element and is connected with the segment. The drive comprises teeth as by means of a gear wheel.

According to the invention it is furthermore advantageous that at the side of the segment remote from the drive a guiding is provided for taking up a shifter. It is also of advantage when the cutting torch is arranged on the shifter. Besides the changing of the angle of the cutting torch by the segment, it is therefore possible in an advantageous way to also adjust the cutting torch by the shifter arranged at the segment. From this there results in an advantageous way an adjusting of the cutting torch by about 80° with respect to the vertical.

By the device according to the invention it is possible in a simple way to adjust a cutting torch so that welding edge profiles of the most differing form can be cut without an expensive and time-consuming adjustment at the multiple torch aggregate.

THE DRAWINGS

FIGS. 4-6 illustrate different angular settings of a cutting torch.

DETAILED DESCRIPTION

Figure 1:
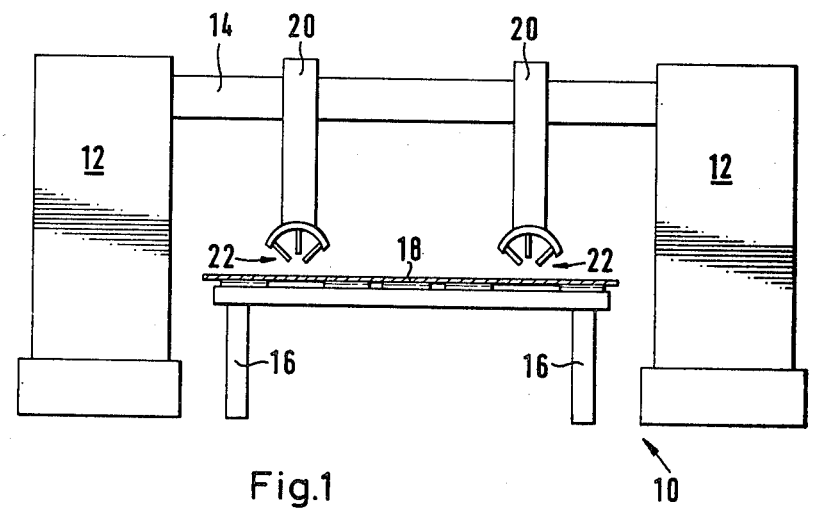
FIG. 1 shows in a simplified presentation a cutting torch machine.

In FIG. 1 is shown a simplified cutting torch machine 10. This machine has two side members 12, in which the drive for the machine is arranged between the two side member 12 and connecting them with each other is a transverse track 14 below which there is a pick-up table 16 (e.g. a roller train), for the workpiece which has to be treated, e.g. a sheet metal 18. At the transverse track 14 there are for example two multiple-torch aggregates 20 arranged adjustably transversely as well as elevationally, as is common in the art. Each of these multiple-torch aggregates, carries at its lower end, which is turned towards the workpiece, several cutting torches 22 disposed toward the workpiece and fastened in a manner later described.

Figure 2:
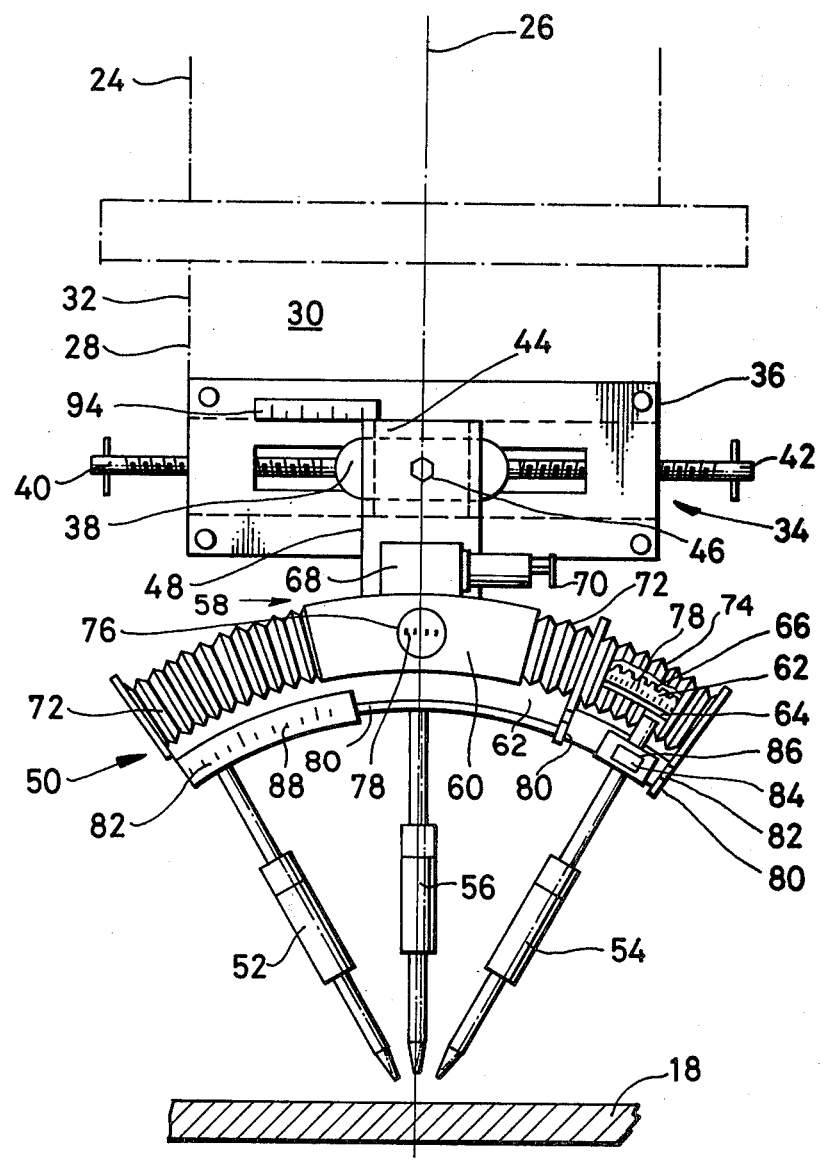
FIG. 2 illustrates in a front elevation view the lower end of a torch aggregate.
Figure 3:
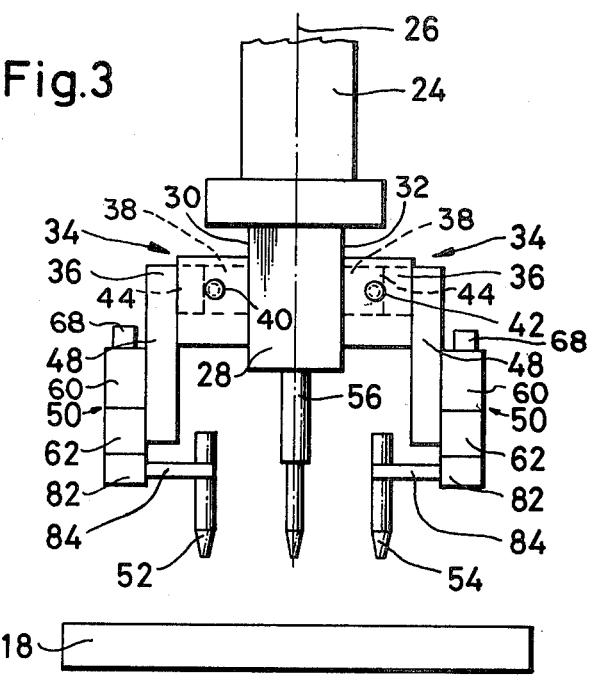
FIG. 3 is a side elevation view of the device of FIG. 2.

FIGS. 2 and 3 illustrate the lower end of a pipe-shaped hanging or support 24 to which is mounted the multiple-torch aggregate 20. The support is rotatably around its vertical axis 26 and ends in a square-shaped part 28 on whose two opposite broadsides 30, 32 there is fastened a shifting device 34 for adjusting the horizontal positioning of the torches.

The shifting device 34 includes a U-shaped guide-frame 36 whose branches are screwed on at the broadside 30 (32). Inside of the guide-frame 36, there is a horizontally shiftable pass-element 38, which is maintained inside the guiding track of the frame 36, so that it can be shifted by gliding. In the two front sides of each guiding-frame 36, there is provided a threaded spindle 40, 42, respectively which lie with their inner ends on both sides of the pass-element 38. Pass-element 38 is positioned depending upon the actuation of one or the other threaded spindles 40, 42, respectively. After the corresponding other threaded spindle 42 or 40 had been turned out at a predetermined extent from the guiding frame 36, the pass-element 38 can be shifted to the desired adjustment position. By turning of the other threaded spindle inside, namely until the latter strikes the pass-element, the arresting of the pass-element takes place in its regulated position. The threaded spindles 40, 42, have little rising, so that a sensitive and exact horizontal shifting of the pass element, sliding on the guideway is guaranteed.

With the pass element 38 there is connected a wing or connecting member 44 which serves the actual guiding and holding of the pass element 38 in the guiding frame 36. On this wing there is put by means of a tightening screw 46 a holder 48 on which again an adjustment device 50 is arranged. On the two adjustment devices 50 there are arranged the lateral cutting torches 52, 54, respectively (starting torch and finishing torch). The third cutting torch 56 is vertical and is mounted to the square-shaped part 28 of the support 24. The cutting torches 52-56 are connected through suitable hoses (not shown) with the respective sources of supply for oxygen (for cutting and heating), fuel gas, and emergency cooling water.

Each of the two adjusting device 50 has a guiding arrangement 58 which is fastened to holder 48. Each guiding arrangement is, as it is evident from the drawing, curved like a circular arc and consists essentially of a housing 60 in which a segment 62 likewise curved like a circular arc is displaceably arranged. This segment which is held by lateral ledges 64 in the guiding housing 60 has on its upper side a tooth construction 66, which with a non-illustrated driving pinion of a drive 68 is engaged. The drive 68 arranged on the guiding element 58 takes care of the back and forth motion of the segment 62 containing teeth for a purpose which will be later described. Instead of an electrical drive, it is of course also possible to make the shifting of the segment 62 by hand, by turning the drive 68. For this purpose, there is arranged at the drive a rotary head 70 by whose action the segment is shifted into the one or other direction. For the protection of the segment from dirt and other impurities, in particular of the guiding ledges 64 and the tooth construction 66, there is arranged on both sides on the guiding arrangement 58 a bellows 72, 74. In other words the lateral ledges 64 and tooth construction 66 of each segment 62 are disposed for movement in housing 60 and the portions of ledges 64 and tooth construction 66 disposed outside of housing 60 are protected by respective bellows 72 or 74.

As is furthermore obvious from FIG. 2, there is on the front side of each housing 60 an opening 76 for viewing a scale 78, arranged on each segment 62. For better reading of the scale, a magnifier with a marking line is provided in the opening. The scale comprises a range of a circular arc of 35°, around which, by means of the drive 68, thus the segment 62 can be shifted with, for example, a shifting range of 0°-35° or 0°-40°. At the concave lower side of each segment 62 a T-shaped guiding profile 80 is provided which extends over its entire length of the segment. This guiding profile serves for the gliding-shifting-taking up of a shifter 82. The shifter 82 is the actual carrier of the cutting torch 52 (54). For this purpose, a projecting holder 84 is arranged with an oblong hole 86, in which the cutting torch 52 (54) can be adjusted across to the direction of the motion of shifter 82 and segment 62 to a certain range equal to the size of the oblong hole. On the shifter 82, there is likewise provided a scale 88 with a range of from 0°-45° or 0°-50° around which thus the cutting torch is additionally adjustable. The two adjusting devices 50 are so adjusted with respect to each other, that, when one considers both devices from the front, the beginning (0°) of the two scales 78 and 88 is always on the left side of segment 62 and shifter 82 respectively. This means, upon operation of the adjustment devices 50 — shifting of the segment by the drive 68 and manually of the shifter 82, in order to be able to adjust a difinite angle, the cutting torch 52 is moved to the left and the torch 54 to the right as shown in FIG. 2.

Figure 4:
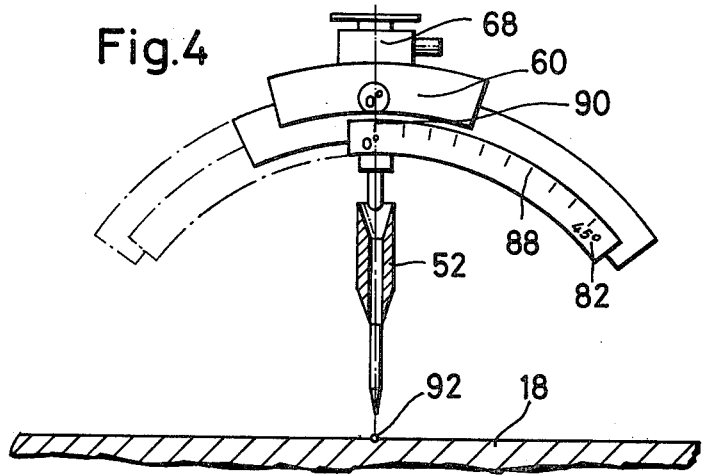

In summary as shown in FIG. 3, a separate arcuate mount is provided for each torch 52, 54 with each mount being on opposite sides of support 24 to provide a counterbalanced mounting with respect to support 24. The specific arcuate adjustment is accomplished in two phases. The first being preferably power actuated by adjusting segment 62 in the first stage of adjustment and where further adjustment is necessary by manually adjusting shifter 82. As is thus apparent from FIGS. 2 and 3 and from the above description each torch 52, 54 is connected to a respective holder 84 which extends laterally from shifter 82 (FIG. 3). Shifter 82 in turn is slidably mounted in an arcuate path on guiding profile 80 (FIG. 2) which in turn is mounted to arcuate segment 62 (FIG. 2). This segment 62 is slidably mounted by means of lateral ledges 64 in arcuate housing 60 with the actual movement being accomplished by drive 68 powering a cog wheel (not shown) in engagement with tooth construction 66. Housing 60 in turn is connected to holder 48 which extends from wing 44 (FIGS. 2 and 3). Each wing 44 is connected to a respective pass element 38 which is mounted for horizontal sliding movement in frame 36. Each frame 36 in turn is mounted to a respective diametrically opposite side of lower end 28 of rotatable support 24 (FIG. 3). In the FIGS. 4 to 6, different positions of the cutting torch 52 (54) are illustrated. FIG. 4 illustrates the starting position in which the laterally adjustable cutting torches are vertically disposed corresponding to the middle cutting torch 56 (FIG. 1). In this position the segment is shifted to the right so that its scale 78 assumes in reference to the opening 76 the 0° position. The gauge point "0°" on the scale 78 is characterized in addition by a line 90 which in its turn serves as starting position of the 0° position of the scale 88 on the shifter 82. Within the range of this 0° measurement on the shifter the cutting torch is arranged on the shifter. When then via the drive 68 the segment is conveyed to the left (FIG. 5) and to the maximum deflection 35° (scale 78) the cutting torch correspondingly assumes also a 35° position, in reference to the vertical axis 26 since the shifter 82 alone is not moved but only together with the segment 62. When it is necessary to place the cutting torch still further obliquely, then the shifter is at extended segment (35°), the shifter 82 is moved until the desired slope is reached. From FIG. 6 is is evident that the cutting torch takes an 80° position. This means that the shifter 82 was moved so far, until the measure 45° of the scale 88 is aligned with the line 90 (0° measure of the segment 62). The addition of both angle values (35° — segment and 45° — shifter), gives the total angle of inclination as 80°. It is apparent and lies within the scope of the invention to adjust the cutting torch in other angular positions, compared with the workpiece 18. The angular position depends only upon the desired welding edge form of the workpiece. The curving of segment and shifter is in each case chosen so that the longitudinal axes of the two, laterally arranged cutting torches 52, 54, as well as the longitudinal axis of the middle, vertically arranged cutting torch 56, intersect each other in a line 92. This line is preferably at the same time the central point of a circular track, on which segment and shifter move according to their curvatures. As previously discussed, by means of the shifting device 34, the entire adjusting device 50 inclusive the cutting torch 52 (54) can be adjusted well out of the center-plane of the multiple torch aggregate. The amount of the shifting can be set on a scale 94, placed at the guiding frame 36 and can be set by means of the threaded spindles 40, 42. In the exemplified embodiment, a lateral horizontal shifting of ± 30 mm. is provided. This lateral shifting is necessary in order to be able to regulate the welding edge profiles to be cut.

By corresponding adjustment of angles of the cutting torches 52, 54, by means of the segment and sometimes of the shifter at the beginning of the cutting process, the desired form of the welding edges is obtained. When in the course of the working process, it should be necessary to change the cutting angle (for correction of the angle position of the cutting torch 52 and/or 54), then a short operation of the drive 68, the segment is changed in the corresponding amount of angle. As the drive there is preferably provided a step-motor whose motor shaft requires 200 steps for one revolution. One revolution causes again a regulation of the segment by 1°. By this, a very exact angle adjustment of the cutting torch is possible.

With the arrangement of the cutting torch, according to the invention at a multiple torch aggregate (horizontal shifting 34, angle setting 50), it is possible in an advantageous manner, to quickly align the cutting torches to the welding edge form to be produced and such alignment is done only once by a lateral shifting of the cutting torch by means of the threaded spindle or by adjustment of the chamfer angle with the cutting torch via the electrical (manually operable) drive 68. By the reciprocal arrangement of the two devices 34, 50, on the sides lying opposite of the square-shaped part 28 of the support 24 there is also obtained due to the compact construction of the welding torches a place-saving structure. Furthermore, due to the arrangement on both sides of the devices 34, 50, a uniform distribution results at the support 24 so that no one-sided loading occurs on it.

Because of the compact construction of the shifting device 34, as well as the adjusting device 50 which is fastened on it, there furthermore results, in comparison with the former multiple torch aggregates of this type a considerable saving of weight which is of particularly great importance when on one cutting torch machine there are several such multiple-torch aggregates, such as, for example 6, 8 or 12 aggregates. Thus, it is possible in an advantageous way due to the limited masses, to dimension the driving of the machine smaller. Furthermore, the device of the invention, distinguishes itself by its easy operability (i.e. adjusting of the torches) and maintenance. Possible damages on the cutting torches or the devices 34, 50 can be eliminated by simple and fast installation and dismantling.

In summary shifting devices 34 are mounted on support 24 and carry movable pass-elements 38 for adjusting the horizontal positioning of the torches as reflected on scale 94. The torches are connected to shifting devices 34 by means of holder 48 suspended from pass-elements 38. In this respect housing 60 of adjusting device 50 is fastened to holder 48 and segment 62 is arcuately movable in housing 60 as reflected on scale 76. Guide 80 is mounted to segment 62 and the torches are actually held by shifters 82 movable in guide 80 as reflected by scale 88. An initial angular adjustment may be made by actuating drive 68 to move segment 62 and if further adjustment is required this can be done by moving shifter 82.

What is claimed is:

1. In a cutting torch machine with at least one support arranged displaceably on a transverse track on which a multiple torch aggregate is provided with the torches of the aggregate being adjustable relative to each other, characterized in that said support is rotatable about its vertical axis, a first horizontal shifting device mounted on the lower end of said support, a second horizontal shifting device mounted on said lower end of said support diametrically opposite said first horizontal shifting device with said horizontal shifting devices thereby being mounted on opposite sides of said support to provide a counterbalanced mounting with respect to said support, an adjusting device being mounted to each of said shifting devices, each of said adjusting devices consisting of a segment and a drive for said segment, a holder connected to each of said adjustable devices, said segment being mounted to said holder and being movable in a guiding element for carrying its cutting torch, said drive being arranged on said guiding element and being connected with said segment, said segment being curved like a circular arc, the segment portions projecting on both sides from the guiding element being mounted in a bellows housing, on the side of the segment remote from said drive there being provided a guide housing shifting means, and each cutting torch being mounted to its said shifting means for movement thereby whereby each cutting torch has its angular position changed in accordance with the adjustment of its said adjusting device.

2. The cutting torch machine according to claim 1, characterized in that the cutting torch can be adjusted by its segment to an angle of 0°-40° and by its shifting means to an angle of 0°-50° with respect to the vertical axis.

3. The cutting torch machine according to claim 2, characterized in that the cutting torch can be adjusted to a total angle of 80° with respect to the vertical axis by manipulation of its segment and shifting means.

4. The cutting torch machine according to claim 3, characterized in that said shifting means is manually adjustable for the angle adjustment of the cutting torch.

5. The cutting torch machine according to claim 4, characterized in that the angle adjustment of the cutting torch can be determined by means of scales in said adjusting device.

6. The cutting torch machine according to claim 5, characterized in that said segment and said shifting means are movable on an arcuate path whose center is the point of intersection of the longitudinal axes of all of the cutting torches in the aggregate.

7. In a cutting torch machine with at least one support arranged displaceably on a transverse track on which a multiple torch aggregate is provided with the torches of the aggregate being adjustable relative to each other and with the torches including at least two movable torches and one vertical torch, characterized in that said support is rotatable about its vertical axis, a first horizontal shifting device mounted on the lower end of said support, a second horizontal shifting device mounted on said lower end of said support diametrically opposite said first horizontal shifting device with said horizontal shifting devices thereby being mounted on opposite sides of said support to provide a counterbalanced mounted with respect to said support, each of said horizontal shifting devices including means for moving said movable torches in a horizontal direction, an adjusting device being mounted to each of said shifting devices, each of said adjusting devices consisting of a segment and a drive for said segment, said segment comprising a first means in said adjusting device for changing the arcuate position of said movable torches, a second means connected to said segment for further changing the arcuate position of said movable torches, each of said horizontal shifting devices including a horizontally movable pass-element, a housing mounted to said pass-element with an arcuate path therein, said segment being mounted in said housing and movable on said path, a guide mounted to said segment and movable therewith, said guide having a path therein parallel to said arcuate path, said second means including a shifter movable in said guide along its path, each of said movable torches being mounted to a respective one of said shifters for changing its angular position in accordance with the adjustment of its said adjusting device, and said vertical torch being vertically mounted directly mounted to said support.

8. The cutting torch machine according to claim 7, characterized in that said lower end of said support has a square cross-section.

9. The cutting torch machine according to claim 8, characterized in that threaded spindles are provided on both sides of said pass element movable toward and away from each other in said guide to control the positioning of said pass element.

10. The cutting torch machine according to claim 9, characterized in that a holder connects said pass element with said adjusting device, and a scale being provided to indicate the relative position of said holder.

11. The cutting torch machine according to claim 10, characterized in that a connecting member connects said holder to said pass element for the guiding of said pass element in said guide.

12. The cutting torch machine according to claim 11, characterized in that said segment is mounted to said holder and is movable in a guide for carrying its cutting torch.

13. The cutting torch machine according to claim 12, characterized in that said drive is arranged on said guide and is connected with said segment by means of a cog wheel engaging teeth on said segment.

14. The cutting torch machine according to claim 13, characterized in that said segment is curved like a circular arc.

15. The cutting torch machine according to claim 14, characterized in that the segment portions projecting on both sides from the said guide are mounted in a bellows housing.

16. The cutting torch machine according to claim 15 characterized in that each of said movable torches can be adjusted by its segment to an angle of 0°–40° and by its shifting device to an angle of 0°–50° with respect to the vertical axis.

17. The cutting torch machine according to claim 16, characterized in that each of said movable torches can be adjusted to a total angle of 80° with respect to the vertical axis by manipulation of its segment and shifting device.

18. The cutting torch machine according to claim 17, characterized in that said shifting means is manually adjustable for the angle adjustment of its movable torch.

19. The cutting torch machine according to claim 18, characterized in that the angle adjustment of its movable torch can be determined by means of scales in said adjusting device.

20. The cutting torch machine according to claim 19, characterized in that each segment and its shifting device is movable on an arcuate path whose center is the point of intersection of the longitudinal axes of all of said torches in the aggregate.

* * * * *